Patented June 29, 1948

2,444,270

UNITED STATES PATENT OFFICE 2,444,270

METHOD OF PREPARING ORGANOGERMANIUM HALIDES

Eugene G. Rochow, Schenectady, N. Y., assignor to General Electric Company, a corporation of New York No Drawing. Application April 16, 1946,
Serial No. 662,625

15 Claims. (Cl. 260—429)

This invention relates to new and improved methods for the preparation of organogermanium halides, specifically hydrocarbon-substituted germanium halides.

The present invention is based on my discovery that organogermanium halides, more particularly hydrocarbon-substituted germanium halides, e. g., dimethyl germanium dichloride,

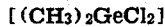

can be produced by effecting reaction between germanium and a hydrocarbon halide. The reaction may be carried out in the presence or absence of a metallic catalyst for the reaction. The germanium may be used as such or in the form of alloys or mixtures with metals, specifically metals that themselves are catalysts for the reaction between germanium and a hydrocarbon halide.

It was known prior to my invention that hydrocarbon halides could be caused to react with elements other than germanium. For example, the reaction of hydrocarbon halides with silicon is disclosed and claimed in Rochow U. S. Patent 2,380,995, issued August 7, 1945, and assigned to the same assignee as the present invention. Another example is the reaction of zinc or the zinc-copper couple with alkyl halides to give alkyl zinc halides.

Zinc dimethyl also has been prepared by heating metallic zinc with methyl bromide or iodide in a liquid state in a sealed tube. All such reactions are liquid-phase reactions.

It was also known prior to my invention that various hydrocarbon - substituted germanium halides could be produced. For example, G. T. Morgan and H. D. K. Drew have prepared aryl germanium halides, e. g., triphenyl germanium bromide, diphenyl germanium dibromide, phenyl germanium tribromide and phenyl germanium trichloride by effecting reaction between germanium tetrachloride and a great excess of magnesium phenyl bromide [J. Chem. Soc., 127, 1760 (1925)]. C. A. Kraus and C. L. Brown have prepared diphenyl germanium dichloride by the chlorination of tetraphenylgermanium [J. A. C. S., 54, 3690–6 (1930)]. Trimethyl germanium bromide has been prepared by L. M. Dennis and W. I. Patnode [J. A. C. S., 52, 2779–82 (1930)]. Finally, C. A. Kraus and E. A. Flood obtained triethyl germanium bromide by effecting reaction between germanium tetraethyl and a solution of bromine in ethyl bromide [J. A. C. S. 54, 1635–44 (1933)].

Briefly described, my invention resides in the improved method of preparing organogermanium halides, more particularly hydrocarbon-substituted germanium halides, for example, alkyl germanium chlorides, bromides, etc., aryl germanium chlorides, bromides, etc., which comprises effecting reaction between germanium and an hydrocarbon halide, for example, an alkyl chloride, bromide, etc., an aryl chloride, bromide, etc. In a preferred embodiment of the invention, reaction is effected between the germanium and the hydrocarbon halide while the latter is in a vapor state, and more particularly while the said components are intimately associated with a metallic catalyst (for example, copper or silver) for the reaction. For instance, the germanium may be in the form of an alloy thereof with copper or other metal that has a catalytic effect upon the reaction between germanium and the hydrocarbon halide.

One specific method feature of my invention is the new and improved method of preparing, for example, methyl germanium chlorides which comprises bringing methyl chloride, more particularly gaseous methyl chloride, into contact with a solid mass containing germanium, for example, a mass of germanium intimately associated with copper, heating the said methyl chloride and germanium-containing mass at a temperature sufficiently high to effect reaction between the methyl chloride and the germanium of the said mass and recovering the methyl germanium chlorides.

Another specific method feature of the invention is the method which comprises causing gaseous methyl chloride or other hydrocarbon halide in gaseous or vapor state to react with germanium intimately associated, as by alloying with copper or other metallic catlyst for the reaction, said reaction being carried out within the temperature range of 200° to 500° C. or more, and recovery the hydrocarbon-substituted germanium halides; for example, the effluent gaseous products may be cooled by suitable means to obtain a condensate comprising hydrocarbon-substituted germanium halides, specifically methyl germanium chlorides.

In order that those skilled in the art better may understand how the present invention may be practiced, the following illustrative examples thereof are given. All parts are by weight.

Example 1

A stream of gaseous methyl chloride was passed into a heated tube where it came in contact with finely powdered germanium present in the tube. A reaction temperature of the order of 460° C. was maintained within the tube during the passage of the methyl chloride. The products passing from the exit end of the reaction tube were condensed in a low-temperature trap. The condensate was distilled and the product boiling above 25° C. was separated. This fraction was identified as containing essentially dimethyl germanium dichloride [$(CH_3)_2GeCl_2$], since analysis of this fraction showed that it contained approximately 46% chlorine. Dimethyl germanium dichloride contains 40.85% chlorine and methyl germanium trichloride ($CH_3GeCl_3$) contains 54.9% chlorine. This result, together with the fact that the product hydrolyzed to a water-soluble oily phase without any precipitate of germanium dioxide, indicates that the product was ides, e. g., dimethyl germanium dichloride.

Approximately 85 parts germanium, which had been previously crushed to a fine powder, was mixed thoroughly with 21 parts copper powder and the mixture of powders pressed into a disk under heavy pressure. The disk was broken into small pieces and packed into a glass reaction tube. The tube was heated at a temperature of about 320–360° C. while a slow stream of gaseous methyl chloride was passed through the tube for about 70 hours. The reaction products obtained at the exit end of the tube were condensed in a low-temperature trap. After this time, the mixture of germanium and copper powders was removed from the tube, again pressed into a disk, broken into small pieces, and fired in hydrogen at 705° C. to effect alloying of the mixture. This alloy was broken into small pieces, repacked into the reaction tube, and methyl chloride passed over the mass at a temperature of about 320–360° C. for approximately 120 hours.

In all, 132 parts of liquid product was obtained. This product was fractionally distilled to yield about 94 parts of a liquid boiling at 124° C. Analysis of this fraction showed that it had 40.84% chlorine, 13.75% carbon, 3.40% hydrogen, and 41.41% germanium (theoretical for dimethyl germanium dichloride is 40.85% chlorine, 13.84% carbon, 3.47% hydrogen, and 41.82% germanium), indicating that it was substantially pure dimethyl germanium dichloride. This compound melted at −22° C. and had a density of 1.488 at 26° C. Hydrolysis of this material gave an oily phase which dissolved in an excess of water. The solubility of the hydrolyzed product in water makes dimethyl germanium dichloride entirely different from dimethyl silicon dichloride, since hydrolysis of the latter compound leads to a water-insoluble oil.

Besides the dimethyl germanium dichloride so recovered and identified, there was obtained approximately 18 grams of material containing methyl germanium trichloride, trimethyl germanium chloride, etc.

Example 3

The germanium-copper alloy, in powder form, used in Example 2 was loaded into a small reactor tube and the powder was exposed to the passage of gaseous ethyl chloride at a temperature of approximately 320° C. The condensate was fractionally distilled to yield a fraction boiling between 144° C. (the boiling point of diethyl germanium dichloride disclosed in the literature) and 175° C. (the boiling point of ethyl germanium trichloride disclosed in the literature). The chlorine content of this fraction was 41.3%, which is between that of ethyl germanium trichloride (51.2% chlorine) and that of diethyl germanium dichloride (35.2% chlorine). These data indicate that the ethyl chloride had reacted with the germanium to produce a mixture of ethyl germanium chlorides in which diethyl germanium dichloride preponderated. The fraction containing the ethyl germanium chlorides was shaken with water. The hydrolysis products formed at first an oily phase which later dissolved in the water on continued shaking just as the methyl homologue had done.

Example 4

Finely ground germanium was thoroughly mixed with finely ground silver powder in a ratio, by weight, of 5 parts of the former to 1 part of the latter. This mixture was packed into a glass reaction tube and fired in air at 650° C. The tube was then heated at a temperature of about 440° C. and monochlorobenzene vapor was passed through the heated tube maintained at this temperature. Analysis of the condensate showed it to consist mainly of diphenyl germanium dichloride [$(C_6H_5)_2GeCl_2$] with smaller amounts of other phenyl germanium chlorides. The products hydrolyzed to the corresponding hydroxides and could be condensed to the corresponding phenyl-substituted germanium oxides.

Example 5

Approximately 10 parts finely ground germanium was mixed thoroughly with an equal amount of finely divided copper. This mixture was packed into a glass tube and the tube heated to a temperature of about 318° C. Methyl bromide gas was passed through the heated tube at a rate of about 5 cc. per minute for 72 hours. During this period of time, the temperature of the tube varied from about 340–350° C. The vapors issuing from the exit end of the tube were condensed in a low-temperature trap to obtain about 28 parts of a yellowish liquid. This liquid was fractionated to yield a fraction boiling at about 148–208° C., which on further analysis was found to contain trimethyl germanium bromide, dimethyl germanium dibromide and methyl germanium tribromide.

It will be understood, of course, by those skilled in the art that my invention is not limited to the specific hydrocarbon halides named in the above illustrative examples and that any other hydrocarbon halide may be employed as a reactant with the germanium, the conditions of reaction generally being varied, depending, for example, upon the particular starting hydrocarbon halide and the particular end product desired to be obtained. In general, the vapor-phase reactions are preferred because they can be carried out more economically, may be controlled more easily and may be directed toward the production of the desired organo-germanium halides with a minimum of by-products.

Likewise, the invention is not limited to the specific temperatures or temperature ranges mentioned in the examples. However, the reaction temperature should not be so high as to cause an excessive deposition of carbon upon the unreacted germanium during the reaction. In general, the reaction temperature to be used will vary with, for example, the particular hydrocarbon halide employed, the particular catalyst (if any) used and the yields of the specific reaction products desired to be obtained from a particular starting hydrocarbon halide. For instance, by varying the temperature of reaction within the temperature range of, say, 200° to 500° C. the proportions of the individual product obtained when methyl chloride is brought into contact with germanium can be varied and also the over-all rate of reaction of the methyl chloride. At temperatures of the order of 200° C. the reaction proceeds much more slowly than at reaction temperatures around 250° to 400° C. At temperatures much above 450° C. in the case of methyl chloride for example, there is a very great exothermic reaction which generally results in an undesirable deposition of carbon in the reaction tube. Although methyl germanium chloride in varying yields can be produced by effecting reaction between methyl chloride and germanium at various temperatures within the temperature range of 200° to 500° C., optimum results usually are obtained within the more limited range of 250° to 400° C.

It will also be understood by those skilled in the art that metallic catalysts other than copper and silver may be employed to accelerate or to control the course of the reaction between the hydrocarbon halide and the germanium. Examples of such catalysts, in addition to copper and silver, are nickel, tin, antimony, manganese and titanium.

The present invention provides new and improved methods for the production of alkyl germanium halides (as, for example, methyl, ethyl, propyl, butyl, amyl, isoamyl, hexyl, etc., germanium halides), the aryl germanium halides (as for example, phenyl germanium halides, etc.), the aryl-substituted aliphatic germanium halides (as for example, benzyl germanium halides, phenylethyl germanium halides, etc.), and the aliphatic-substituted aryl germanium halides (as for example, tolyl germanium halides, etc.).

The products of this invention have utility as intermediates in the preparation of other products. For instance, they may be employed as starting materials for the manufacture of waxy or resinous organogermanium oxides. In addition, hydrolysis products of these hydrocarbon-substituted germanium halides may be used as lubricating media for certain applications.

What I claim as new and desire to secure by Letters Patent of the United States is:

1. The method of preparing organogermanium halides which comprises effecting reaction, in the presence of a catalyst selected from the class consisting of copper, silver, nickel, tin, antimony, manganese, and titanium, between germanium and a hydrocarbon halide in a vapor state at a temperature of from 200° to 500° C.

2. The method of preparing alkyl germanium halides which comprises effecting reaction in the vapor phase and at a temperature of from 200° to 500° C. between germanium and an alkyl halide in the presence of a catalyst selected from the class consisting of copper, silver, nickel, tin, antimony, manganese, and titanium.

3. The method of preparing aryl germanium halides which comprises effecting reaction in the vapor phase and at a temperature of from 200° to 500° C. between germanium and an aryl halide in the presence of a catalyst selected from the class consisting of copper, silver, nickel, tin, antimony, manganese, and titanium.

4. The method of preparing phenyl germanium chlorides which comprises effecting reaction in the vapor phase and at a temperature of from 200° to 500° C. between germanium and chlorobenzene in the presence of a catalyst selected from the class consisting of copper, silver, nickel, tin, antimony, manganese, and titanium.

5. The method of preparing hydrocarbon-substituted germanium halides which comprises effecting reaction at a temperature of from 200° to 500° C. between germanium and the vapors of a hydrocarbon halide while the said components are intimately associated with a metallic catalyst for the reaction selected from the class consisting of copper, silver, nickel, tin, antimony, manganese, and titanium.

6. The method of preparing hydrocarbon-substituted germanium halides which comprises effecting reaction at a temperature of from 200° to 500° C. between germanium and the vapors of a hydrocarbon halide while the said components are intimately associated with copper.

7. The method of preparing hydrocarbon-substituted germanium halides which comprises effecting reaction at a temperature of from 200° to 500° C. between the vapors of a hydrocarbon halide and germanium in the form of an alloy thereof with a metal that is a catalyst for the reaction, the said catalyst being a member selected from the class consisting of copper, silver, nickel, tin, antimony, manganese, and titanium.

8. The method of preparing hydrocarbon-substituted germanium halides which comprises effecting reaction at a temperature of from 200° to 500° C. between the vapors of a hydrocarbon halide and germanium in the form of an alloy thereof with copper.

9. The method of preparing methyl germanium chlorides which comprises effecting reaction in the vapor phase and at a temperature of from 200° to 500° C. between germanium and methyl chloride in the presence of a catalyst selected from the class consisting of copper, silver, nickel, tin, antimony, manganese, and titanium.

10. The method of preparing methyl germanium chlorides which comprises effecting reaction at a temperature of from 200° to 500° C. between germanium and gaseous methyl chloride while the said components are intimately associated with copper.

11. The method of preparing methyl germanium chlorides which comprises effecting reaction at a temperature of from 200° to 500° C. between gaseous methyl chloride and germanium in the form of an alloy thereof with a metallic catalyst selected from the class consisting of copper, silver, nickel, tin, antimony, manganese, and titanium.

12. The method of preparing methyl germanium chlorides which comprises effecting reaction at a temperature of from 200° to 500° C. between gaseous methyl chloride and germanium in the form of an alloy thereof with copper.

13. The method of preparing methyl germanium chlorides which comprises bringing gaseous methyl chloride into contact with a mass of germanium intimately associated with copper, heating the said methyl chloride and germanium-copper mass at a temperature of from 200° to 500° C. which is sufficiently high to effect reaction between the methyl chloride and the germanium of the said mass, and recovering the methyl germanium chlorides.

14. The method which comprises causing gaseous methyl chloride to react with germanium intimately associated with copper, said reaction being carried out within the temperature range of 200° to 500° C., and cooling the effluent gases to obtain a condensate comprising methyl germanium chlorides.

15. The method of preparing phenyl germanium chlorides which comprises effecting reaction in the vapor phase and at a temperature of from 200° to 500° C. between germanium and chlorobenzene while the said reactants are intimately associated with silver.

EUGENE G. ROCHOW.

REFERENCES CITED

The following references are of record in the file of this patent:

UNITED STATES PATENTS

| Number | Name | Date |
|---|---|---|
| 1,639,947 | Kraus et al. | Aug. 23, 1927 |
| 2,253,128 | Longkammerer | Aug. 19, 1941 |
| 2,269,498 | Wainer | Jan. 13, 1942 |
| 2,380,995 | Rochow (I) | Aug. 7, 1945 |
| 2,383,818 | Rochow (II) | Aug. 28, 1945 |

FOREIGN PATENTS

| Number | Country | Date |
|---|---|---|
| 469,518 | Great Britain | July 26, 1937 |

OTHER REFERENCES

Backer, Rec. Trav. Chem., vol. 54 (1935), pages 607–617.

Certificate of Correction

Patent No. 2,444,270. June 29, 1948.

EUGENE G. ROCHOW

It is hereby certified that errors appear in the printed specification of the above numbered patent requiring correction as follows: Column 2, line 36, for "catlyst" read *catalyst*; column 3, line 16, for "ides, e. g.," read *principally*; same line, strike out the comma after "dichloride" and insert instead a period; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*